United States Patent
Decreamer et al.

[11] Patent Number: 6,011,591
[45] Date of Patent: Jan. 4, 2000

[54] METHOD OF DISPLAYING A VGA IMAGE ON A TELEVISION SET

[75] Inventors: Alain Decreamer, Garches, France; Michel W. Nieuwenhuizen, Eindhoven, Netherlands

[73] Assignee: U.S. Philips Corporation, New York, N.Y.

[21] Appl. No.: 08/886,996

[22] Filed: Jul. 2, 1997

[30] Foreign Application Priority Data

Jul. 3, 1996 [FR] France ................................. 96 08284

[51] Int. Cl.⁷ ........................................... H04N 7/01
[52] U.S. Cl. ..................... 348/441; 348/550; 348/553; 348/555
[58] Field of Search ............................ 348/542, 543, 348/545, 443, 446, 456, 552, 550, 553, 555, 556, 557; H04N 3/27, 5/46

[56] References Cited

U.S. PATENT DOCUMENTS

| | | | |
|---|---|---|---|
| 3,855,496 | 12/1974 | Ciciora | 315/410 |
| 4,298,888 | 11/1981 | Clles et al. | 358/140 |
| 4,368,367 | 1/1983 | Peterson et al. | 358/140 |
| 4,384,305 | 5/1983 | Sonnenberger | 358/158 |
| 5,455,628 | 10/1995 | Bishop | 348/446 |
| 5,510,843 | 4/1996 | Keene et al. | 348/446 |
| 5,815,208 | 9/1998 | Samela et al. | 348/446 |

FOREIGN PATENT DOCUMENTS 07306664A  11/1995  Japan .

*Primary Examiner*—Andrew I. Faile
*Assistant Examiner*—Alexander Berhe
*Attorney, Agent, or Firm*—Steven S. Rubin

[57] ABSTRACT

The field-display means of a conventional television set are used, to which the odd lines of a VGA image are transmitted during one field and the even lines during the next field, thereby providing for the use of a television set as a computer monitor.

7 Claims, 2 Drawing Sheets

METHOD OF DISPLAYING A VGA IMAGE ON A TELEVISION SET

BACKGROUND OF THE INVENTION

1. Field of the Invention

The invention relates to a method of displaying an image supplied by a graphics processor of the VGA type by making use of the field-display means of a conventional television set.

The invention also relates to an apparatus for displaying television images, provided with field-display means and allowing display of an image supplied by a graphics processor of the VGA type.

2. Discussion of Related Art

For displaying an image supplied by a VGA graphics processor on the screen of a conventional television set, different means for modifying the horizontal scanning frequency of the television set have been proposed. However, none of them is really satisfactory, and particularly these means are rather complicated. It has also been proposed in the document Patent Abstract of Japan 07306664 A to store the contents of the lines so as to display them in a non-synchronous manner with respect to their generation by the VGA graphics processor.

SUMMARY OF THE INVENTION

It is an object of the invention to provide the possibility of displaying an image supplied by a VGA graphics processor on the screen of a conventional television set in a very simple manner.

To this end, the even lines of a VGA image are transmitted to said display means during one field and the odd lines are transmitted to said display means during the next field.

The invention is thus based on the recognition that the duration of the line of a conventional television set is approximately half that of a VGA monitor and that, consequently, one out of two lines can be displayed by modifying the scanning rate to a very small extent.

Advantageously, the synchronizing pulses of the VGA image are shifted by approximately half the duration of the VGA line.

An apparatus for displaying television images according to the invention comprises selection means for transmitting the even lines of a VGA image to the field-display means during one field and the odd lines during the next field.

The selection means advantageously comprise means for dividing the VGA line-synchronizing frequency by two, and means for delaying the synchronizing pulses of the VGA image by approximately half the duration of the VGA line.

In a particular embodiment, the means for delaying the pulses comprise two cascade-arranged time-delay circuits, one for fixing the delay time and the other for fixing the duration of the delayed pulse.

The image display apparatus is advantageously provided with means for varying the line-scanning amplitude.

The displayed image can thus cover the full width of the screen.

When the image display apparatus is provided with a cathode ray tube and a device for generating a sawtooth current in a deflection coil, with an S capacitance arranged in series with the coil, the means for varying the line-scanning amplitude are advantageously means for switching another S capacitance.

Particularly the central parts of the lines are thus elongated.

These and other aspects of the invention are apparent from and will be elucidated with reference to the embodiments described hereinafter.

DESCRIPTION OF THE PREFERRED EMBODIMENTS

Figure 1:
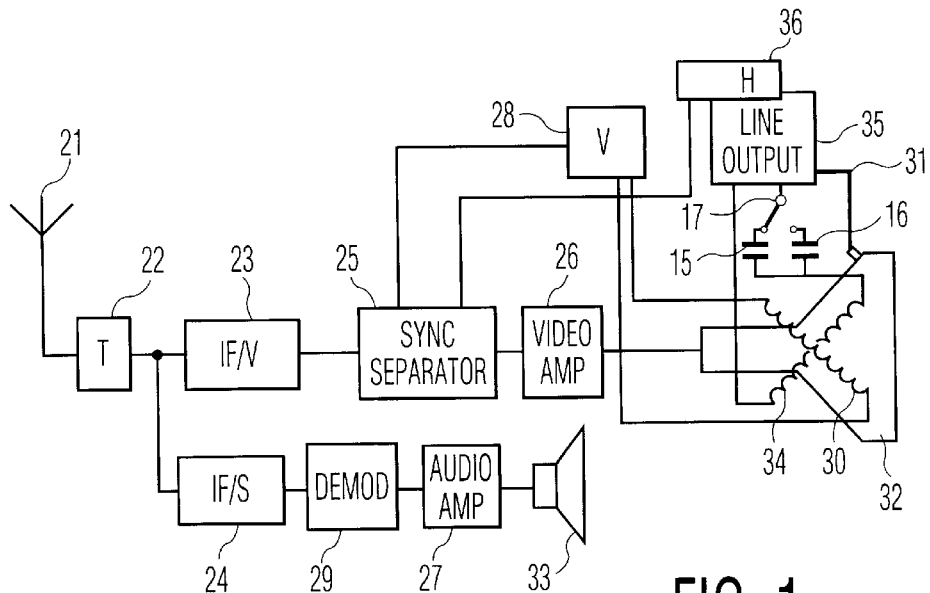
FIG. 1 shows diagrammatically a television set.

The television set which is shown in a block diagram in FIG. 1 comprises a tuner 22 receiving a signal from, for example, an antenna 21, and transposing its frequency to intermediate frequencies for an intermediate-frequency video amplifier 23 and an intermediate-frequency audio amplifier 24. The IF audio amplifier 24 precedes a demodulator 29 which supplies the audio signals in the baseband to an audio power amplifier 27 feeding a loudspeaker 33.

The IF video amplifier 23 precedes a unit 25 which supplies a video signal in the baseband to a video amplifier 26 applying video signals to a cathode ray tube 32. From this signal, the unit 25 also extracts line and field-synchronizing signals which are applied to a field-scanning circuit 28, which supplies a current in a field deflection coil 30, and to a line-scanning circuit 36 associated with a line output stage 35 which supplies, via a coupling capacitance 15 referred to as S capacitance, a current in a line deflection coil 34 and also produces a voltage of approximately 25 kV for feeding the screen of the display tube to which it is connected by means of a connection 31.

The line-scanning frequency in the VGA standard is 31,500 Hz and the field frequency is 60 Hz. Half the VGA line-scanning frequency is thus 15,750 Hz and the line frequency of a "625-line" television set is 15,625 Hz, i.e. a proximate value. The line-scanning synchronizing circuits of a television set are capable of accepting the passage of 15,625 to 15,750 lines without any particular modification and, likewise, the field-scanning synchronizing circuits are capable of accepting the passage of 50 Hz to 60 Hz.

The VGA video information is conveyed by three color signals referred to as R G B.

Figure 2:
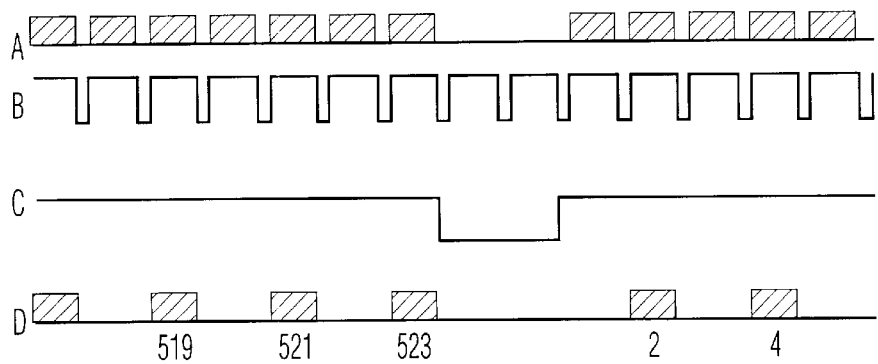
FIG. 2 is a time diagram illustrating different signals of a VGA image.

In FIG. 2, the line A shows the video contents of the successive lines of the VGA image. The line B shows the corresponding line-synchronizing pulses. The line C shows a corresponding field-synchronizing pulse. The line D shows a line which is identical to the line A but in which, during the field which ends at the left in the Figure, only the odd lines of the VGA image are preserved (the Figure shows the last lines, denoted by the reference numerals 519, 521, 523) and, during the field which starts at the right in the Figure, only the even lines are preserved (the Figure shows the first lines denoted by the reference numerals 2, 4). If a television set displays the contents of the lines indicated at D, it will produce, by interlacing, the complete original image in two fields instead of one.

In FIG. 3, the line B again shows the VGA line-synchronizing pulses. The line E shows signals obtained by triggering a bistable flipflop at the falling edges of the signal of the line B. The falling edges of the signal of the line E trigger a time delay circuit which has a delay of t1 and this circuit triggers in its turn a time delay circuit having a duration of t2, which finally provides the pulses of line F. The line D is the same as that in FIG. 2. The video contents are centered with respect to the pulses of the line F when they would be shifted with respect to the edges of the screen of the television set if the pulses of the line F were not delayed with respect to the start of those of line E. This shift is equal to approximately half the duration of the VGA line.

Figure 3:
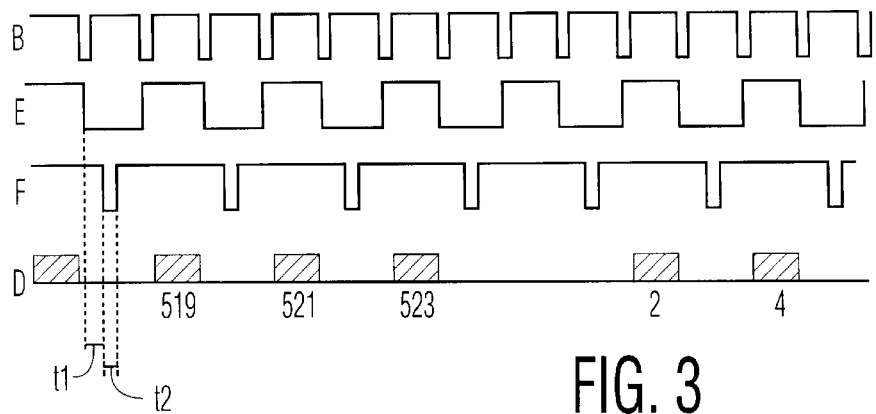
FIG. 3 is another time diagram illustrating different signals used for displaying a VGA image on a television set.
Figure 4:
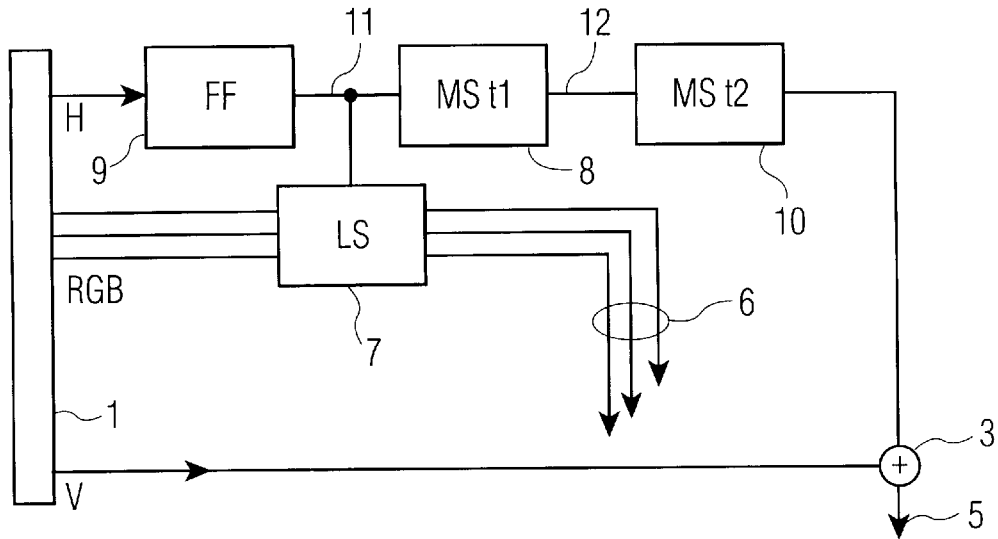
FIG. 4 is a diagram of the circuit realizing operations on the signals for displaying a VGA image on a television set.

The circuit shown in FIG. 4 realizes operations which must be performed on the VGA signals for displaying the VGA image on a television set. The horizontal synchronizing VGA signals H, the vertical synchronizing signals V and the signals R G B are applied to an input connector 1 which may be, for example, the scart connector of the television set. A line selection circuit 7 transmits the signal R G B or bars the way for one line out of two so as to create three color signals, each represented by the line D in FIG. 3 or 4. This signal is applied by the three connections 6 to the video amplifier 26 shown in FIG. 1. The circuit 7 is constituted, for example, by three analog gates, one for each of the signals R, G, B.

Based on the signal H, a flipflop 9, for example a JK flipflop divides the VGA line-synchronizing frequency by two and supplies the signal of the line E of FIG. 3 at 11. This signal is applied to the gate-control circuit 7.

A time-delay circuit 8, for example a monostable circuit also receives the signal from the flipflop 9. At the end of a time t1 after the falling edge of the signal at 11, it supplies a falling edge at 12.

A second time-delay circuit 10, for example again a monostable circuit, receives the signal at 12 and, in response, supplies a pulse having a duration of t2 corresponding to the signal of the line F in FIG. 3. These pulses are delayed by approximately half the duration of the VGA line with respect to the falling edges of the pulses of the line E.

An analog adder 3 adds the signal V to the signal supplied by the circuit 10, which produces a field and line-synchronizing signal at 5 which is applied to the circuit 25 shown in FIG. 1.

Figure 5:
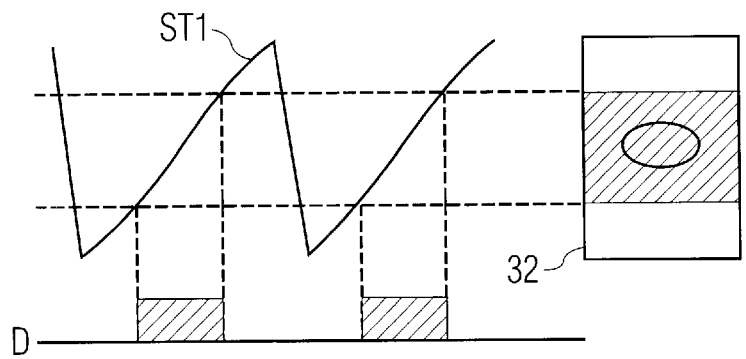
FIGS. 5 and 6 illustrate how the image obtained can be improved.

FIG. 5 shows line-scan sawteeth ST1 and the screen of the television set at 32 whose horizontal lines are vertical in this case, in other words, the screen is turned 90° with respect to its normal position. If the means described above are used, the video signal of the line D temporally corresponds for each line to the part of the sawtooth situated between the two vertical broken lines, i.e. the image obtained on the screen is situated between the two horizontal broken lines.

Figure 6:
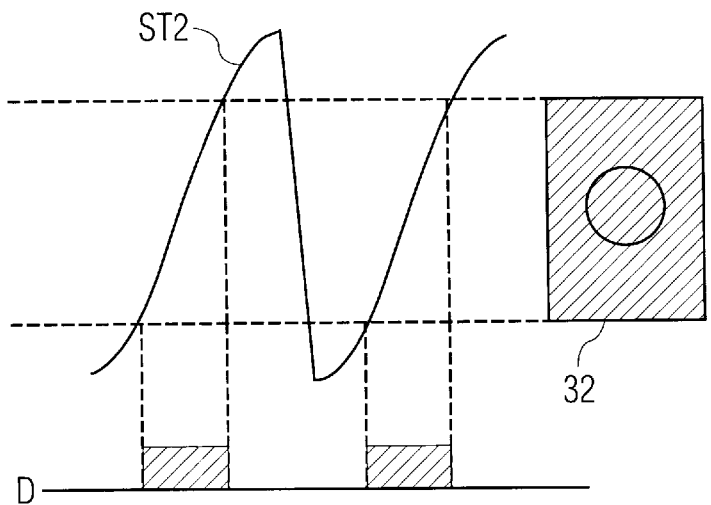

FIG. 6 shows how the display can be improved by increasing the line-scanning amplitude. It shows line-scan sawteeth ST2 which are elongated with respect to hose in FIG. 5 and whose shape at S is more accentuated, i.e. it is particularly the central art of the line which has been elongated. The video signal of the line D always corresponds temporally, for each line, to the part of the sawtooth situated between the two vertical broken lines, and the image obtained on the screen is situated between the two horizontal broken lines and now covers the whole width of the screen in its normal proportions.

An elongation of the line scan as shown in FIG. 6 with respect to that shown in FIG. 5 may be obtained by reducing the value of the S capacitance 15 (FIG. 1). This may be obtained by replacing the capacitance 15 by another, smaller capacitance 16 by means of any known switching system 17 which does not form part of the invention: for example, a means for switching an S capacitance is described in the document EP-A-96 202 557.3. As a variant, a switch may also be connected so as to add an additional S capacitance in parallel with the capacitance 15, instead of switching a capacitance 16 in its place. In this case, the switch adding the additional capacitance must be closed in order to put the additional S capacitance into operation during normal operation of the television set, and opened to render the additional S capacitance inoperative when VGA images are displayed.

We claim:

1. An apparatus for displaying VGA images each having odd and even lines, on a television, said apparatus comprising:

a field-display allowing display of said images using a line scan;

a transmitter for transmitting the even lines of said image to the field display during one field and the odd lines during a subsequent field; and a means for varying an amplitude of said line-scan to thereby alter said display of said images on said field display.

2. A method as claimed in claim 1 wherein said VGA image includes synchronizing pulses and said synchronizing pulses of the VGA image are shifted by approximately half the duration of one of said lines of the VGA image.

3. An apparatus as claimed in claim 1, wherein said VGA images include a line-synchronizing frequency and said apparatus further includes means for dividing the line-synchronizing frequency by two.

4. An apparatus as claimed in claim 1, wherein said VGA images include synchronizing pulses and said apparatus further includes means for delaying the synchronizing pulses of the VGA image by approximately half the duration of one of said lines of a VGA image.

5. An apparatus as claimed in claim 4, wherein the means for delaying the synchronizing pulses comprise two cascade-arranged time-delay circuits, one for fixing the delay time and the other for fixing the duration of the delayed pulse.

6. An apparatus for displaying television images comprising:

a field-display allowing display of an image supplied by a VGA graphics processor using a line scan having an amplitude;

selection means for transmitting the even lines of a VGA image to the field display during one field and the odd lines during a subsequent field;

means for varying the line-scan amplitude;

a cathode ray tube; and a device for generating a sawtooth current in a deflection coil, with an S capacitance arranged in series with the coil, and the means for varying the line-scan amplitude is a means for switching another S capacitance.

7. A method of displaying a VGA image on a television, said method comprising:

receiving a first field of said VGA image, said first field including a plurality of lines;

displaying, using a line scan, a first set of said lines of said first field;

receiving a second field of said VGA image, said second field including a plurality of lines;

displaying, using a line scan, a second set of said lines of said second field, said second set being distinct from said first set; and varying an amplitude of said line scan thereby altering a display of said lines.

* * * * *